(12) United States Patent
Vlasblom

(10) Patent No.: US 6,921,113 B1
(45) Date of Patent: Jul. 26, 2005

(54) CONNECTOR ASSEMBLY AND METHOD OF MANUFACTURE

(75) Inventor: Casparus Vlasblom, Zoetermeer (NL)

(73) Assignee: Casparus PDS B.V., Zoetermeer (NL)

( * ) Notice: Subject to any disclaimer, the term of this patent is extended or adjusted under 35 U.S.C. 154(b) by 0 days.

(21) Appl. No.: 09/959,887

(22) PCT Filed: May 10, 2000

(86) PCT No.: PCT/NL00/00303

§ 371 (c)(1),
(2), (4) Date: Apr. 1, 2002

(87) PCT Pub. No.: WO00/68607

PCT Pub. Date: Nov. 16, 2000

(30) Foreign Application Priority Data

May 10, 1999 (NL) .................................. 1012020

(51) Int. Cl.[7] ........................... F16L 37/00; F16L 29/00
(52) U.S. Cl. .................... 285/307; 285/24; 251/149.8; 251/149.1; 141/348
(58) Field of Search ........................... 285/307, 24, 26, 285/27, 29; 251/149.1, 149.8; 141/348, 349

(56) References Cited

U.S. PATENT DOCUMENTS

| 909,061 | A | * | 1/1909 | Chew | 137/223 |
|---|---|---|---|---|---|
| 1,700,632 | A | * | 1/1929 | Gay | 251/149.1 |
| 3,871,422 | A | * | 3/1975 | Elson et al. | 137/231 |
| 4,375,864 | A | * | 3/1983 | Savage | |
| 4,445,551 | A | * | 5/1984 | Bond et al. | |
| 4,595,006 | A | * | 6/1986 | Burke et al. | 606/94 |
| 4,672,993 | A | * | 6/1987 | Bilak | 137/322 |
| 5,232,125 | A | * | 8/1993 | Adams | 222/83.5 |
| 5,344,119 | A | * | 9/1994 | Wang | 251/149.1 |
| 5,370,270 | A | * | 12/1994 | Adams et al. | 222/88 |
| 6,126,045 | A | * | 10/2000 | Last | 222/501 |

FOREIGN PATENT DOCUMENTS

| DE | 30 03 398 A | * | 8/1980 |
|---|---|---|---|
| WO | WO 94/29215 | * | 12/1994 |

* cited by examiner

*Primary Examiner*—Eric K. Nicholson
*Assistant Examiner*—James M. Hewitt
(74) *Attorney, Agent, or Firm*—Young & Thompson

(57) ABSTRACT

A connector assembly for allowing a free-flowing medium to pass through includes: a hollow female element with a transverse closure wall and passage openings which are formed in the side wall, a male element which can be inserted into the female element and can be coupled thereto, an adapter socket, inside which the female element can be displaced in the axial direction between a position in which it closes off the flow of medium and in which the passage openings are closed off by the adapter socket, and a position in which it allows medium to flow through and in which the passage openings are not closed off by the adapter socket. The female element is provided, at a distance from the transverse closure wall, with connecting elements which can form a connection with connecting elements arranged on the male element and/or a coupling piece which is coupled thereto.

6 Claims, 9 Drawing Sheets

Fig 1
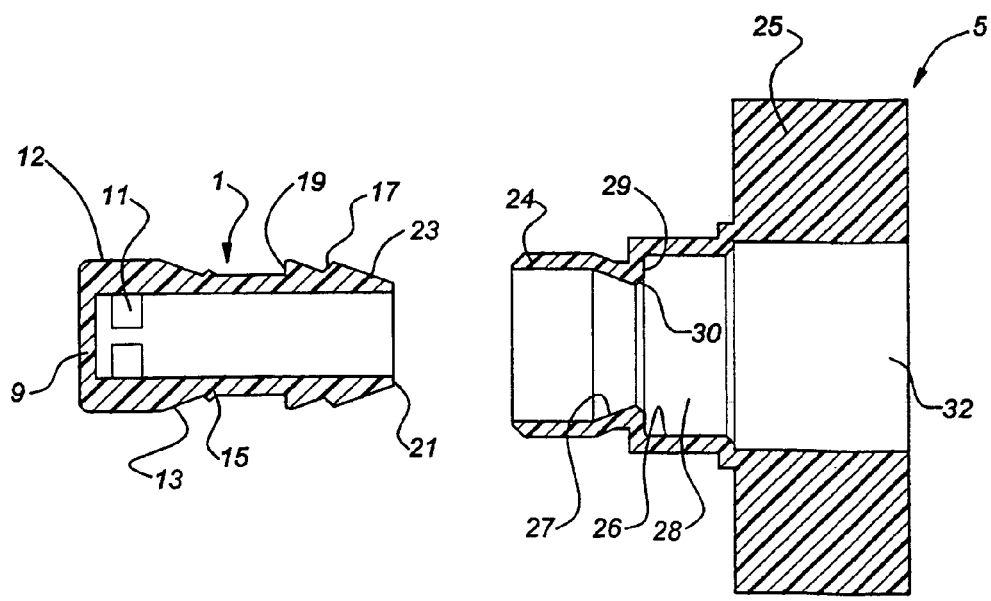
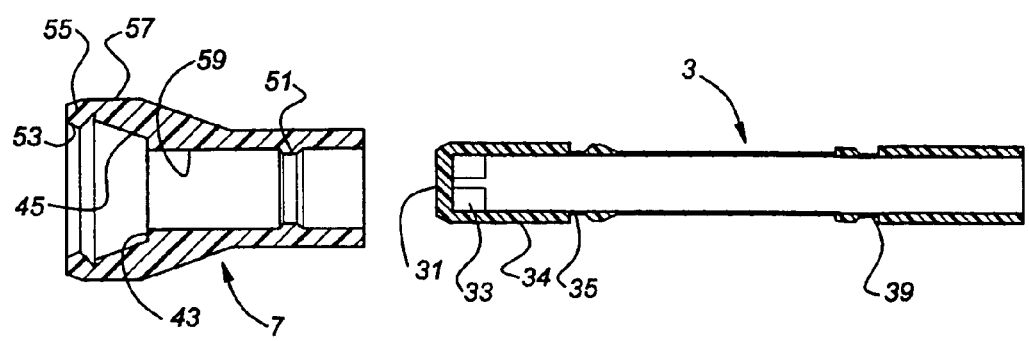

Fig 14
Fig 15
Fig 16
Fig 17
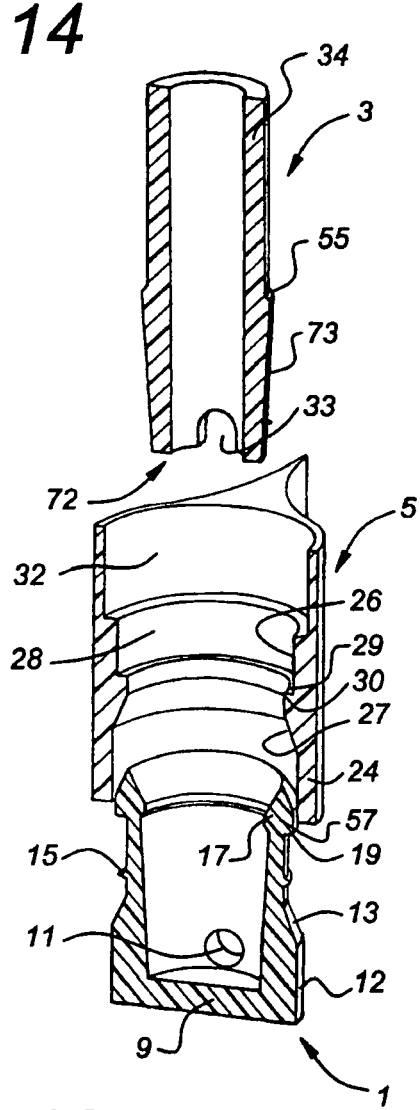
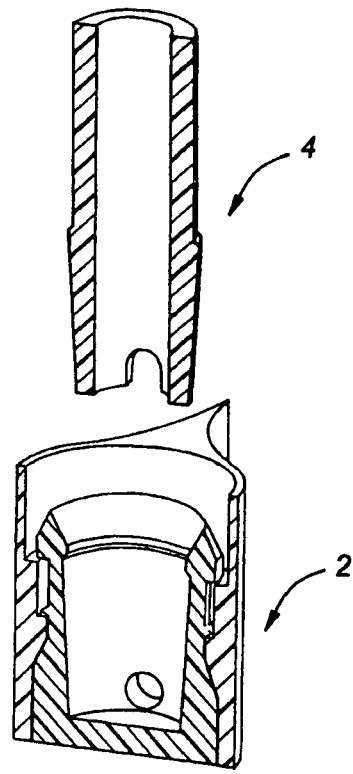
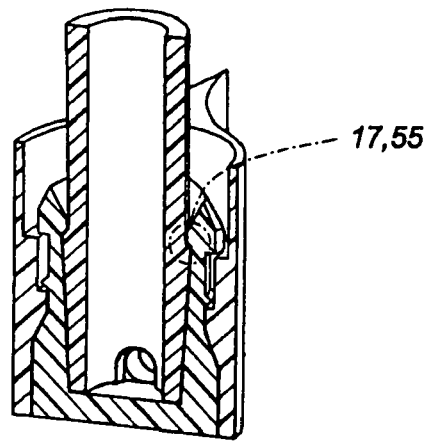
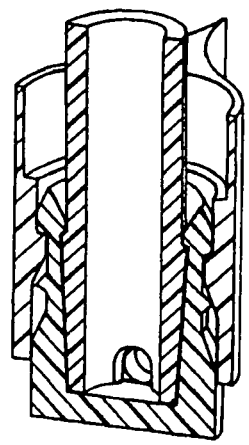

CONNECTOR ASSEMBLY AND METHOD OF MANUFACTURE

BACKGROUND AND SUMMARY OF THE INVENTION

The invention relates to a connector assembly for optionally allowing a free-flowing medium to pass through, comprising:
- a hollow female element with a transverse closure wall and passage openings which are formed in the side wall,
- a male element which can be inserted into the female element and can be coupled thereto, an adapter socket, inside which the female element can be displaced in axial direction between a position in which it closes off the flow of medium and in which the passage openings are closed off by the adapter socket, and a position in which it allows medium to flow through and in which the passage openings are not closed off by the adapter socket, in which assembly the female element is provided, at a distance from the transverse closure wall, with connecting means which can form a connection with connecting means arranged on the male element or a coupling piece coupled to the male element, and in which assembly, as a result of actuation of the male element or said coupling piece coupled thereto, the female element can be displaced between the above-mentioned position in which it closes off the flow of medium and the above-mentioned position in which it allows medium to flow through, in which latter position the connecting means of the female element are accommodated in a relatively narrow cavity in the adapter socket, so as to form a connection to the male element or the coupling piece coupled thereto, while in the above-mentioned position in which the flow of medium is closed off, said connecting means are accommodated in a relatively wide cavity in the adapter socket, with the result that the connection between the female element and the male element or the coupling piece coupled thereto can be broken.

A connector assembly of this nature is disclosed in U.S. Pat. No. 4,445,551.

The drawback of the assembly described in this patent is that the elastic properties of the material of the assembly are crucial for it to function. In this connector assembly, the coupling between the male and female elements is brought about by the fact that outwardly projecting coupling means are moved radially inwards, by means of a stop on the adapter socket, when the female element is pushed out of the adapter socket. Consequently, the connecting means are in a deformed state when the male and female elements are coupled to one another. During uncoupling, the coupling means have to spring back outwards as a result of the memory effect of the material in order to release the male element again. It will be obvious that after a certain time the memory effect of the material in question tails off and the action of the assembly is no longer ensured. This problem is exacerbated by the fact that the coupling means, in the position in which medium is allowed to flow through, are clamped in between the male and female elements. Consequently, these coupling means may be in the deformed state for a prolonged period, which has an adverse effect on the memory effect of the material. Another drawback of this is that the coupling means cannot be of circular symmetrical design.

The object of the invention is to eliminate these drawbacks and therefore the coupling between the female element and the male element or the coupling piece coupled thereto takes place by pushing the connecting means of the female element and the connecting means of the male element or the coupling piece connected thereto on each other by which at least one of said connecting means deviates in radial direction from the neutral elastically non loaded position and returns in the radial direction into the coupling position by own elasticity.

To be able to use relatively small forces to bring about the coupling between female element and male element or coupling piece connected to the male element, the locking of the coupled connecting means of the female element and the male element or the coupling piece coupled to the male element takes place by further axial displacement of the male element with respect to the adapter socket into a locking position spaced from the coupling position, in which locking position of the connecting means radial displacement of the connecting means is made impossible.

Furthermore, it is preferable for the female element to be provided with means which limit the movement of the female element inside the adapter socket, and that these means as well as the connecting means of the female element are situated on the side of the passage openings which is remote from the end wall. Consequently, the movement which the female element has to make in order to open the passage openings can be relatively small. This has the advantage that the space which is required in the packaging in order to open the passage openings remains limited. An other advantage is that the female element can be of compact design, so that it is possible to safe on material.

It is also preferable that the assembly has blocking means on the female element and the adapter socket respectively which prevent axial movement of the female element and the adapter socket when the coupling between the female element and the male element or the coupling piece coupled to the male element is achieved, said blocking means being able to absorb an axial load greater than the axial load needed the couple said connecting means of the female element and the male element or the coupling piece connected thereto. This has the advantage that less force is required for coupling: it is only necessary to bring about the coupling between the male element and the female element, why the friction caused by the sealing of the passage openings does not have to be overcome.

Preferably the connecting means of the female element is an inward undercutting and the connecting means of the male element or the coupling piece connected to the male element is an inwardly projecting stop face.

A further drawback of the connector assembly as described in U.S. Pat. No. 4,445,551 is that it is possible for medium to flow through the passage openings in the male element when the male element has been completely uncoupled from the female element. This may be highly undesirable. Therefore, a further object of the present invention is to provide a connector assembly in which flow through the male element is impossible when the male element is not in the through-flow position.

This object is achieved by the fact that the male element is accommodated in a coupling piece, and that the coupling piece in a starting position, seals off the passage openings in the male element, whereas when the connector assembly is in the position in which medium is allowed to flow through, the passage openings in the male element are not sealed off.

In a specific embodiment the coupling piece and the female element are provided with means which can be made to interact with one another so as to couple the coupling piece and the female element, the coupling piece and the male element being provided with means which can be made to interact with one another in order to enable the male element and the coupling piece to be fixed with respect to one another, and when the connector assembly is being moved into the open position, the connection formed by the means for fixing the male element and the coupling piece can absorb an axial load greater than the axial load which is required to bring about the connection formed by the means for fixing the coupling piece and the female element with respect to one another.

An appropriate selection of the type and strength of the connection between the male element, female element and the coupling piece ensures that, when the assembly is being coupled and uncoupled, the coupling piece firstly provides the connection between the female element and the male element and secondly ensures that flow through the male element is only possible in the position in which medium is allowed to flow through. This functionality is achieved by means of the measures described in claims 7 to 12.

One particular function of an embodiment with the coupling piece may be that when the connector assembly is being moved into the open position, the connection formed by the means for fixing the female element and the adapter socket can absorb an axial load greater than the axial load absorbed by the connection formed by interacting means between the male element and the coupling piece.

The invention also relates to a method for producing a combination of the female and the adapter socket of the connector assembly according to the invention by injection moulding.

It is intended that it should be possible to produce the female element and the adapter socket in a joint operation by injection moulding. In this case the method is characterized in that the female element and the adapter socket are produced simultaneously in line with one another, in a single mould cavity, which is formed by a number of interacting mould parts, in such a manner that, after a number of mould parts have been removed, the female element can be pulled into the adapter socket by a mould part which, during the injection moulding, is releasably connected to the female element. Also the male element and the coupling piece could be produced in a joint operation by injection moulding. An appropriate selection of the mould parts allows the female element to function as an injection-moulding shield for the adapter socket. This ensures that the female element and the adapter socket are moulded symmetrically, which is advantageous since it is possible to counteract undesirable deformation of the product caused by non-uniform shrinkage. Furthermore, partial seams are prevented from forming on the sealing surfaces, so that the corresponding seals have a better action and can therefore withstand higher pressures.

Also the combination of male element in the coupling piece could be provided in a similar way in a joint operation.

The invention will now be explained with reference to the figures, which show two exemplary embodiments of connector assemblies according to the present invention. The figures also show an example of the injection mould for production of a female element and an adapter socket.

BRIEF DESCRIPTION OF THE DRAWINGS

FIG. 1 shows a longitudinal section through the four separate components of the connector assembly according to the invention, with the male element provided with a coupling piece.

FIGS. 2 to 6 show the connector assembly from FIG. 1 during its movement from the position in which it closes off the flow of medium into the position in which it allows medium to flow through.

FIG. 14 shows a perspective, cross-sectional view of the components of another embodiment according to the present invention.

FIGS. 15 to 17 show the positions of the components of the connector assembly according to the present invention during coupling.

DETAILED DESCRIPTION OF THE INVENTION

Figure 2:
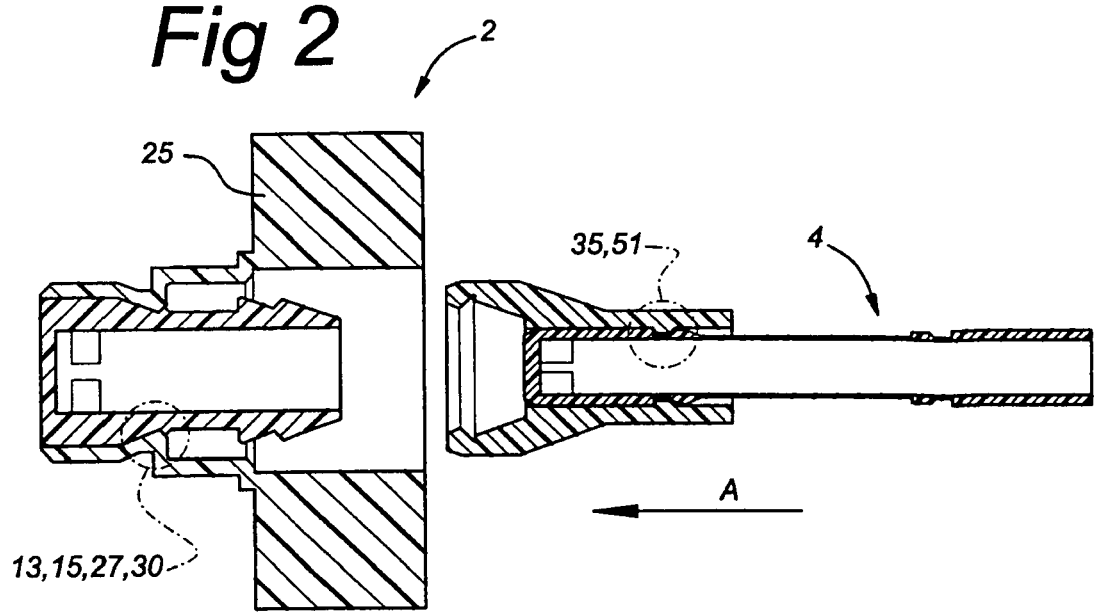

The connector assembly comprises a closure assembly 2 and an opening assembly 4, cf. FIG. 2. The closure assembly 2 comprises a female element 1, in the form of a cap, and an adapter socket 5 in which the said female element 1 is slideably accommodated. The opening assembly 4 comprises a tubular male element 3 and a coupling piece 7 in which the said male element 3 is slideably positioned. In FIG. 1, the four components of the assembly are shown separately and the various details are denoted by reference numerals.

FIG. 2 shows how elements are positioned with respect to one another in the starting situation. The female element 1 is accommodated in the adapter socket 5 in order to form the closure assembly 2. The male element 3 together with the coupling piece 7 forms the opening assembly 4.

The female element 1 comprises an end wall 9 and four openings 11 which are arranged cylindrically near the said end wall 9. Furthermore, the female element is provided with a stop face 13, a locking protrusion 15, a stop rib 17, a stop face 19, an end stop face 21 and a conical entry surface 23.

The adapter socket 5 is provided with a part 25 which can be attached to a packaging or belongs to a packaging, a conical surface 27 and a stop face 29 with a bevelled end face 30. The adapter socket 5 further comprises a narrow socket-like section 28 which is delimited by an inner wall 26.

In the starting situation, as shown in FIG. 2, the female element 1 is positioned in the adapter socket 5, so that the conical face 27 of the adapter socket 5 bears against the face 13 of the female element 1. The locking protrusion 15 bears against the bevelled end face 30 and, together with the stop 13 and the conical surface 27, forms a connection 13, 15, 27, 30 which ensures that the female element 1 is situated in the desired, fixed starting position with respect to the adapter socket 5, cf. FIG. 2. In this situation, the cylindrical holes 11 in the female element 1 are sealed by the socket wall 24 of the adapter 5.

The male element 3 comprises an end wall 31, openings 33 formed in the cylindrical wall 34, a first recess 35 in the outside of the cylindrical wall 34 and a second recess 39 in the cylindrical wall 34.

The coupling piece 7 comprises a stop face 43, a conical widening surface 45, a run-on surface 53, an enclosing stop 57, an inner wall 59, a first locking protrusion 51 and a second connecting protrusion 55.

In the starting situation shown in FIG. 2, the male element 3 is partially accommodated in the coupling piece 7. They are held in position with respect to one another by the fact that the first locking protrusion 51 on the coupling piece 7 fits into the first recess 35 in the male element 3 to form a connection 35, 51. In the starting situation, the openings 33 are closed off by the inner wall 59 of the coupling piece 7. In this situation, it is impossible for medium to flow either through the closing assembly 2 or the opening assembly 4.

Figure 3:
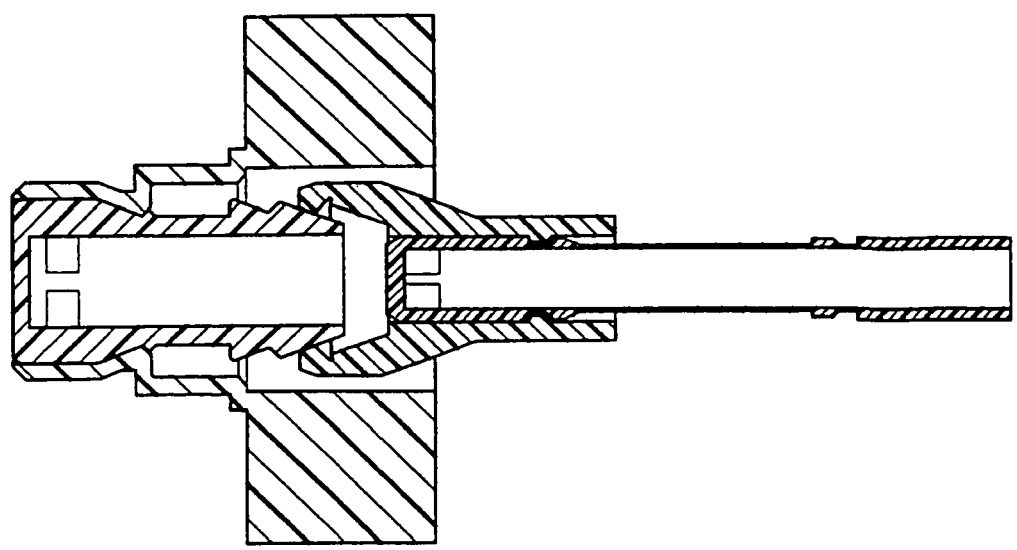

When the closing assembly and the opening assembly are coupled, the opening assembly is fitted into the closing assembly 2, as denoted overall by the arrow A, cf. FIGS. 2 and 3. In the process, a force is exerted on the adapter socket 2 on the one hand and on the male element 3 or the coupling piece 7 on the other hand. The steps which are involved in the coupling operation are shown in FIGS. 2 to 6.

Figure 4:
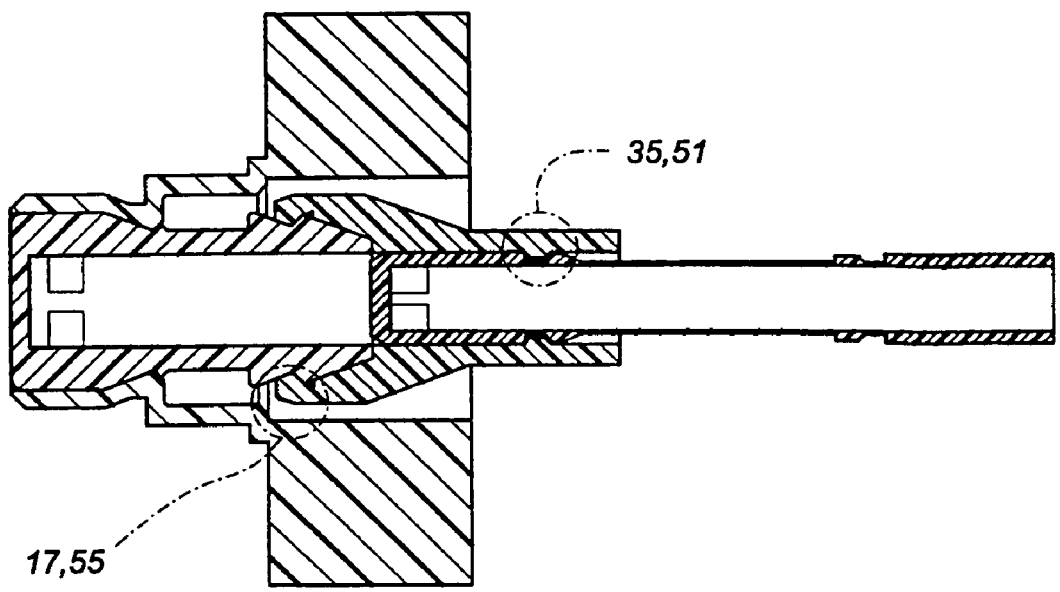
Figure 5:
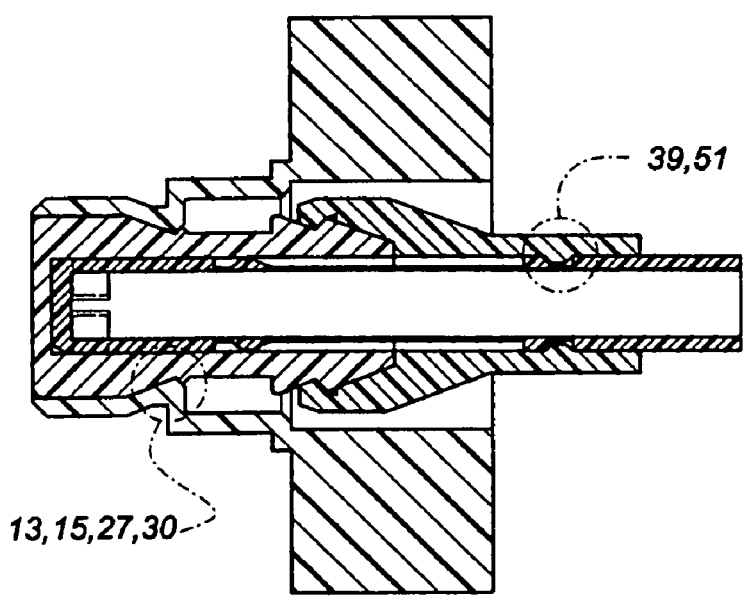

During coupling, the run-on surface 53 of the coupling piece 7 will centre itself around the conical surface 23 of the female element 1, as shown in FIG. 3. When the opening assembly 4 is pushed further into the closing assembly 2, the second connecting protrusion 55 will latch over the stop rib 17 of the female element 1, forming a connection 17, 55. This is shown in FIG. 4. Since the connection 17, 55 exerts a force which is directed in the direction of insertion on the coupling piece 7, the stop face 43 and the end face 21 are pulled together. Consequently, as the openings 33 slide along the seam, it is impossible for any free-flowing medium to leak out of the male element 3 into the passage 32 in the adapter socket 5.

To form the connection 17, 55 in this way, it is necessary for the connection 35, 51 between the male element 3 and the coupling piece 7 to be able to absorb a greater force than that which is required to form the connection 17, 55. If this were not the case, the male element 3 would slide inside the female element 1 before the connection 17, 55 has been formed and therefore without the closing and opening assemblies having been coupled to one another.

Since the stop face 43 of the coupling piece 7 then bears against the female element 1, the force exerted on the male element 3 is transmitted directly to the female element 1. Since the connection 13, 15, 27, 30 can absorb a greater force than the connection 35, 51, the latter will be broken. Consequently, the male element 3 slides into the female element 1 until its end wall 31 bears against the inside of the end wall 9 of the female element 1, cf. FIG. 5. However, before the male element 3 reaches this limit position, the first locking protrusion 51 on the coupling piece 7 is moved into the second recess 39 in the male element 3, with the result that a new connection 39, 51 is formed between the male element 3 and the coupling piece 7. To achieve this, it is necessary for the connection 13, 15, 27, 30 to be able to apply a force which is great enough to produce the connection 39, 51. When the male element 3 is in its position in which it has penetrated as far inwards as possible, openings 33 in the male element 3 and the openings 11 in the female element 1 are aligned with one another.

Figure 6:
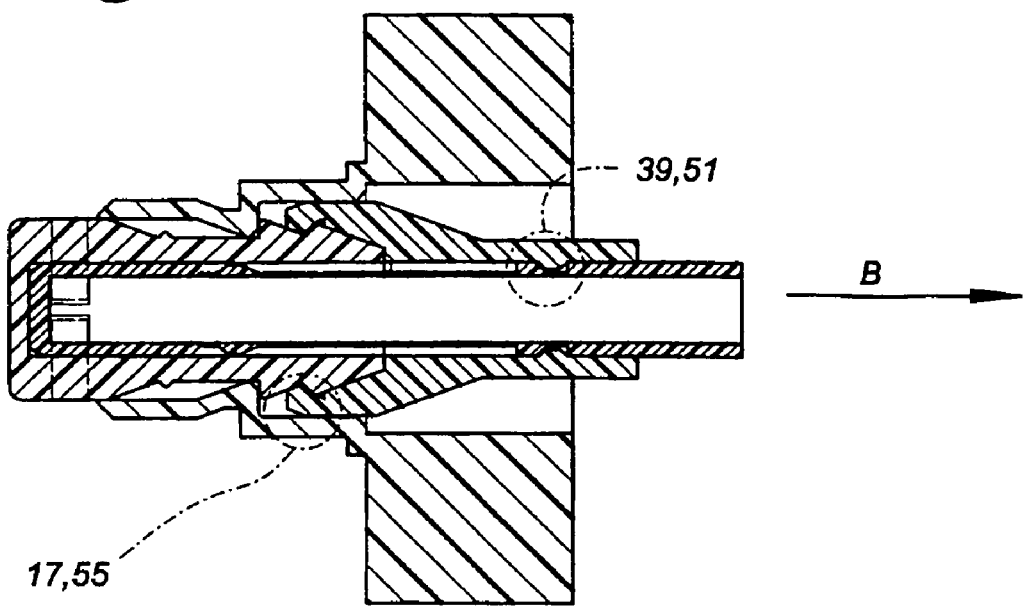

As a result of the male element 3 then being moved further into the female element 1, the connection 13, 15, 27, 30 between the female element 1 and the adapter socket 5 will be broken. This is the only connection which is subjected to load, since the end face 31 of the male element 3 is supported against the end wall of the female element 1, as can be seen in FIG. 6. As a result, the female element 1, with the male element 3 which has been pushed into it, will slide out of the adapter socket 5 until the stop 19 bears against the stop face 29 and the aligned holes 11 and 33 open out freely into the packaging of which part 25 forms part (cf. FIG. 6).

It is now possible for medium to flow out of the male element 3, through the openings 33 which are formed therein, through the aligned openings 11 in the female element, into the packaging, and also in the reverse direction. The friction between the enclosing stop 57 of the coupling piece 7 and the inner surface 26 of the adapter socket 5 ensures that the female element 1 does not slide back into the adapter socket 5. To increase this frictional force, an additional snap-action connection may be fitted.

During uncoupling, the opening assembly 4 is pulled out of the closing assembly 2, in the direction of arrow B, by on the one hand pulling on the male element 3 and on the other hand holding the adapter socket in place, cf. FIG. 6. In the process, the same steps as for coupling are passed through, but in the reverse order. These steps are shown in FIGS. 6 to 9.

Figure 7:
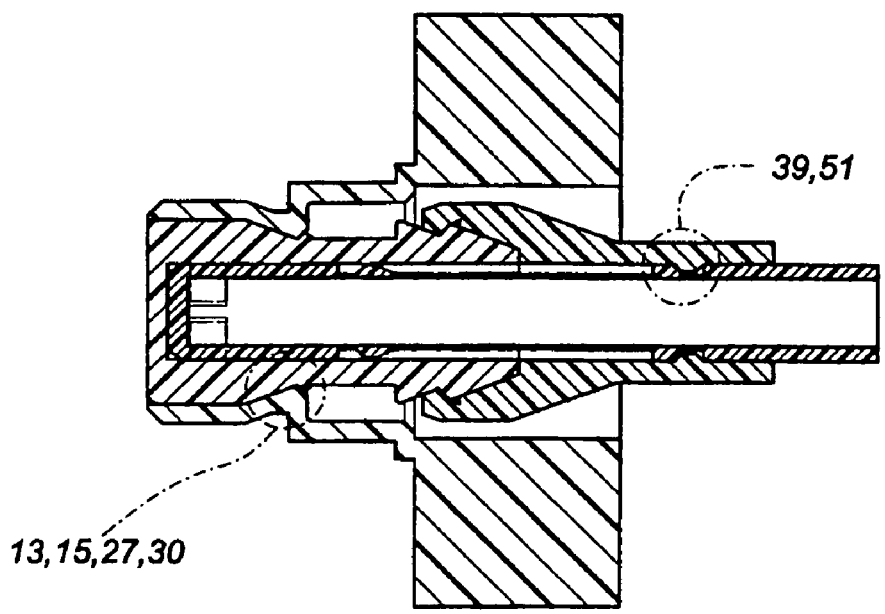
FIGS. 7 to 9 show the connector assembly from FIG. 1 when it is moving from the position in which medium is allowed to flow through into the position in which the flow of medium is closed off.

Since connection 17, 55, in the position in which it has been introduced to the greatest depth, is clamped in between the outer surface 34 of the male element 3 and the inner wall 26 of the narrow socket-like section 28 of the adapter socket 5, this connection 17, 55 cannot be broken. This is shown in FIG. 6. This connection 17, 55 can only be broken when the enclosing stop 57 on the coupling piece 7 is pulled past the narrow socket-like section 28. To enable the female element 1 to be pulled back into the adapter socket 5 before the male element 3 is pulled out of the female element 1, the force which the connection 39, 51 is able to absorb must be greater than the force which is required to produce the connection 13, 15, 27, 30. This state is shown in FIG. 7.

Figure 8:
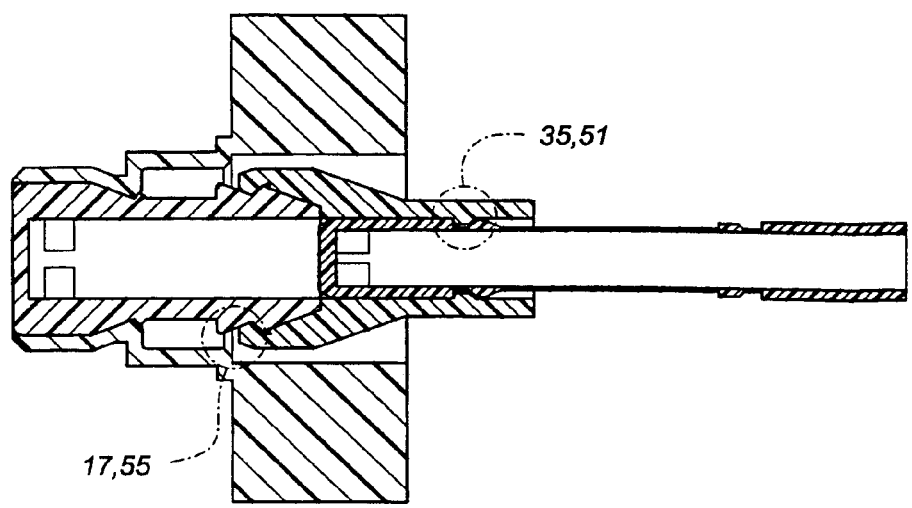
Figure 9:
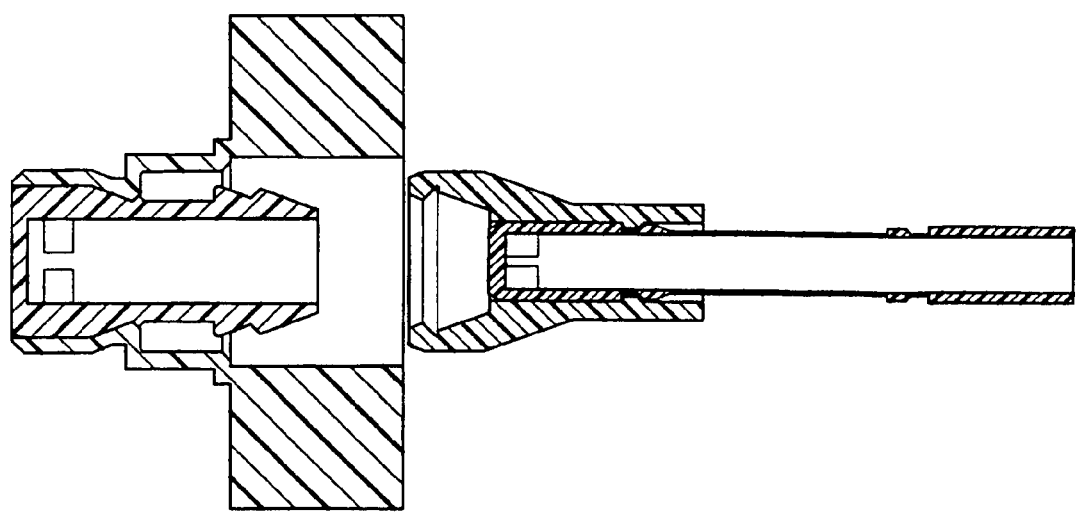

Since it is not possible to pull the female element 1 further into the adapter socket 5, either connection 17, 55 or connection 39, 51 will be broken. Making connection 17, 55 stronger than connection 39, 51 ensures that the male element 3 is pulled back into the coupling piece 7 first, as shown in FIG. 8. Moreover, connection 17, 55 is strong enough to bring about connection 35, 51. To break connection 35, 51 again, more force is required than that needed to break connection 17, 55, and consequently the latter will then be broken and the closing-opening element will be fully uncoupled. This is shown in FIG. 9.

In one embodiment, it is ensured that, during uncoupling, if it is not the male element 3, but rather the coupling piece 7, which is pulled, the aligned openings 11, 33 are pulled back into the adapter socket 5. Since, in this embodiment, the connection 17, 55 remains clamped between the outer surface 34 of the male element 3 and the inner wall 26 of the adapter socket 5, the closing assembly 2 and the opening assembly 4 will remain coupled to one another via the coupling piece 7. Only when the male element 3 is pulled out of the female element 1 is the connection 17, 55 no longer enclosed and the two members can be uncoupled.

By allowing the connector assembly, after the male element and the female element have been coupled, to execute a free movement between the position in which the flow of medium is closed off and the position in which medium is allowed to flow through, and providing the openings 11 in the female element 1 with non-return valves, it is possible to obtain a pumping action. In this way, the liquid, for example, in the packaging can be pressurized by pulling the male element 3 back and forth. This may be useful in order to remove a liquid from a packaging. By providing the male element 3 with non-return valves it is possible, for example, to place the packaging under a slight vacuum.

Figure 10:
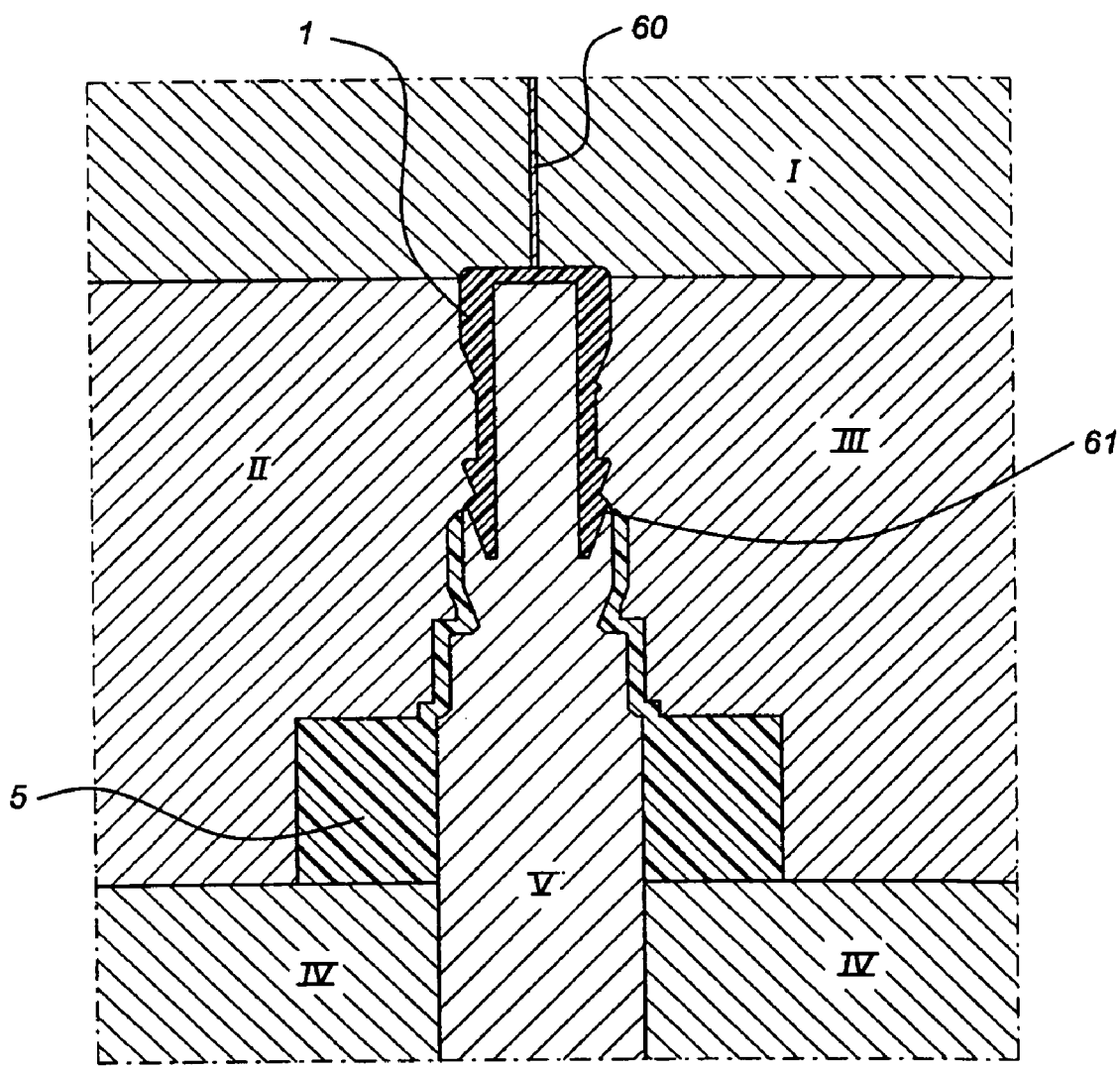
FIGS. 10 to 13 show a cross section through part of an injection mould in various positions during the simultaneous production of the female element and the adapter socket.
Figure 11:
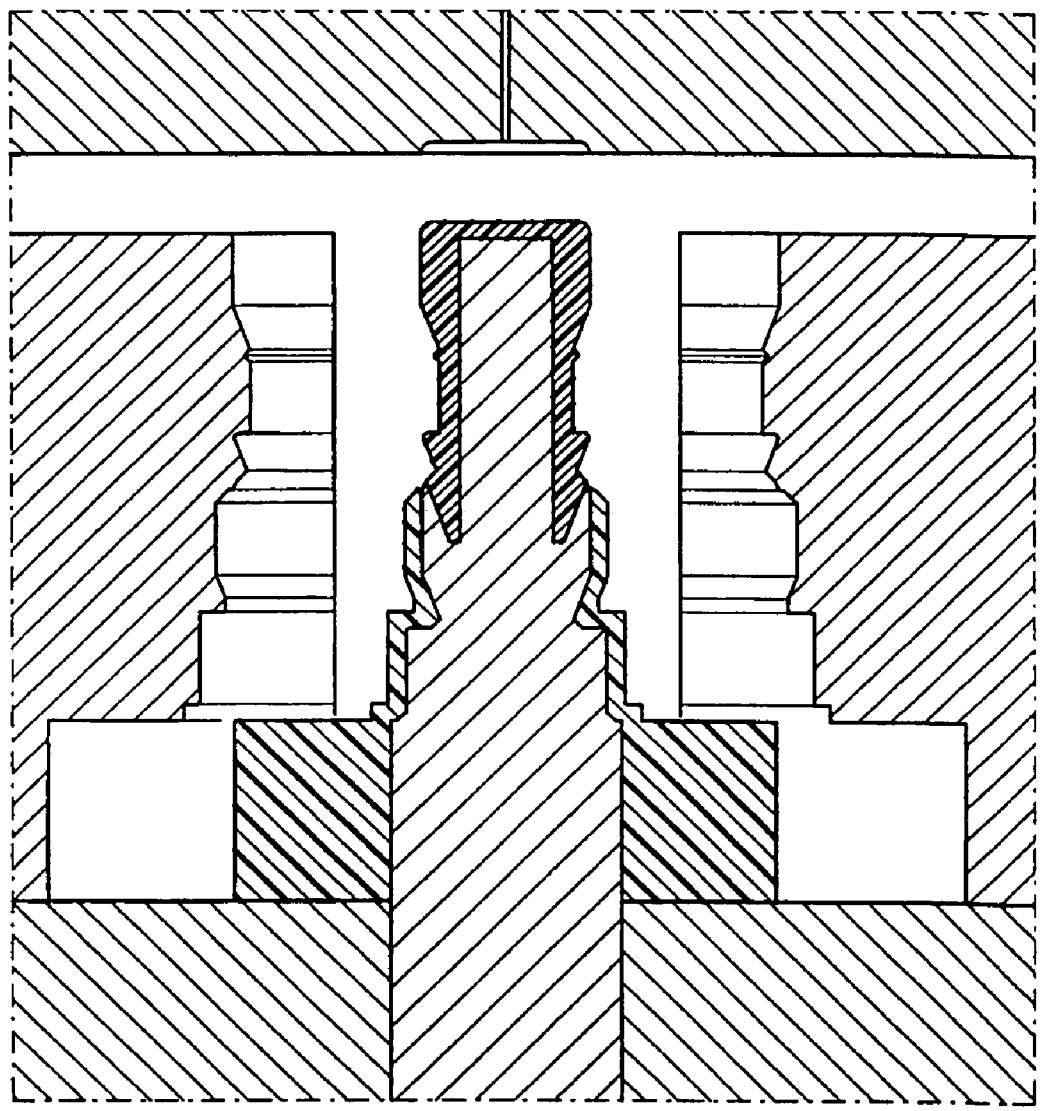
Figure 12:
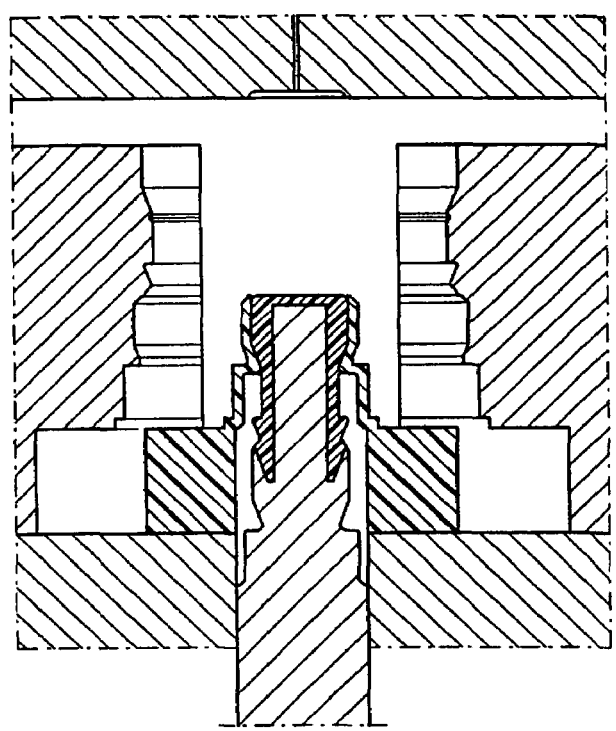

FIGS. 10 to 12 diagrammaticallly illustrate how the closing assembly 2 can be produced in an advantageous way. As stated previously, the female element 1 is used as an injection-moulding screen for the adapter socket 5, cf. FIG.

10. The female element 1 is injected via the gate 60, and via an integral hinge 61 the material can also reach the adapter socket 5. Since both components of the closing assembly 2 are now produced in a single mould cavity, it is possible, by appropriately selecting the mould parts, to assemble the closure piece as soon as it is removed from the mould. To this end, the mould is split, as shown in FIG. 10. A further advantage of this mould splitting is that there is no partial seam formed on the closure surface 12 of the female element 1. By selecting that part of the sealing surface 12 which is formed in mould part 1 to be as large as possible, it is possible to make the seal between the female element 1 and the adapter socket 5 more reliable.

Figure 13:
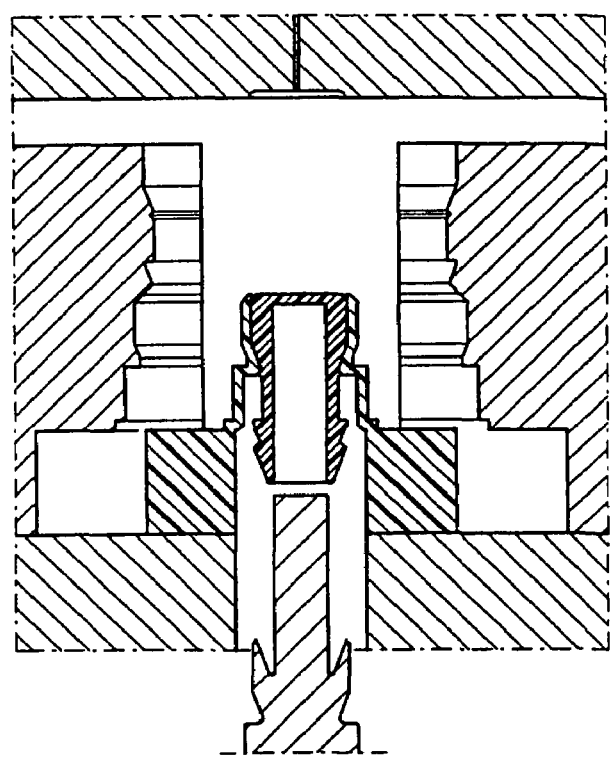

After injection-moulding and solidification, first mould parts I, II and III are moved away, as shown in FIG. 11. By then moving mould part V away from the mould cavity, the female element 1 is pulled into the adapter socket 5, and the membrane 61 between the female element 1 and the adapter socket 5 is broken. This is shown in FIG. 12. Since the female element then cannot be pulled along any further, since it does not fit through the opening in the adapter socket 5, the mould part V is pulled off and the closure assembly 2 has been assembled and can be removed from the mould, as shown in FIG. 13.

Another embodiment of the connector assembly, without coupling piece 7, is shown in FIGS. 14 to 17. In FIG. 14, the three components of this embodiment are shown: the female element 1, the male element 3 and the adapter socket 5.

The female element 1 is a cap-like housing with an end wall 9 on one side. In the vicinity of this end wall 9 there is a sealing surface 12 which is provided with passage openings 11 and is delimited on one side by a stop face 13. On the other side, the female element 1 is provided with a connecting protrusion 17 and an enclosing stop 19.

The adapter socket 5 is a socket-like housing in which the female element 1 can be accommodated. The inner wall of the housing is provided with a section of small diameter 26, a stop protrusion 29 and a conical surface 27.

The male element 3 is a tubular housing with an insertion end 72 and a stop face 73 which, on one side, is delimited by a connecting surface 55. In the vicinity of the insertion end 72, the male element 3 is provided with passage openings 33.

The starting situation is shown in FIG. 15. In this situation, the female element 1 rests in the adapter socket 5, together forming the closing assembly 2, while the male element, which forms the opener 4, is completely uncoupled. In this situation, the surfaces 13 and 27 of the female element 1 and the adapter socket 5, respectively, bear against one another and the passage openings 11 in the female element 1 are sealed shut by the socket-like wall 24.

As a result of the male element 3 being fitted into the female element 1, the connecting protrusion 17 on the female element 1 engages behind the connecting surface 55 on the male element 3, resulting in a connection (17, 55), cf. FIG. 16. In this situation, the passage openings 11, 33 in the female element 1 and male element 3 are aligned, but through-flow is not yet possible. The sealing surface 12 of the female element 1 and the socket-like wall 24 of the adapter socket 5 form a seal. This seal can be improved further by additional sealing means, for example a snap-action connection.

When the male element 3 is then pushed further into the adapter socket 5, the female element 1, together with the male element 3, will move out of the adapter socket 5, and the passage openings 11, 33 are exposed, cf. FIG. 17. The stop protrusion 29 and enclosing stop 19 prevent the female element 1 from being able to move completely out of the adapter socket 5. It is essential for the overlap between the inner wall of the socket-like section 24 of the adapter socket 5 and the sealing surface 12 of the female element 1 to ensure a sufficient seal, so that it is impossible for any medium to flow through between the female element 1 and the adapter socket 5.

When the male element 3 is pulled back out of the adapter socket 5, the connection 17, 55 between the female element 1 and the male element 3 cannot be broken, since the locking protrusion 17 cannot bend outwards, because the enclosing stop 57 is resting against the inner wall of the section of the adapter socket 5 with the small diameter 26. This ensures that the connection 17, 55 can only be broken when the enclosing protrusion 19 has moved past the section with the small diameter 26 and therefore the female element 1 has returned completely to the starting position, cf. FIG. 16.

By pulling on the male element 3 in the situation shown in FIG. 16, it is possible to break the connection 17, 55 and the male element 3 can be uncoupled. In this way, the starting situation shown in FIG. 15 is reached once again.

What is claimed is:

1. Connector assembly for optionally allowing a free-flowing medium to pass through, comprising:
   a hollow female element (1) with a transverse closure wall (9) and passage openings (11) which are formed in the side wall,
   a male element (3) which can be inserted into the female element (1) and can be coupled thereto,
   an adapter socket (5), inside which the female element (1) can be displaced in axial direction between a position in which it closes off the flow of medium and in which the passage openings (11) are closed off by the adapter socket (5), and a position in which it allows medium to flow through and in which the passage openings (11) are not closed off by the adapter socket (5), in which assembly the female element (1) is provided, at a distance from the transverse closure wall (9), with connecting means (17) which can form a connection with connecting means (55) arranged on the male element (3), and in which assembly, as a result of actuation of the male element (3), the female element (1) can be displaced between the above-mentioned position in which it closes off the flow of medium and the above-mentioned position in which it allows medium to flow through, in which latter position the connecting means (17, 55) of the female element (1) are accommodated in a relatively narrow cavity (28) in the adapter socket (5), so as to form a connection to the male element (3), while in the above-mentioned position in which the flow of medium is closed off, said connecting means (17, 55) are accommodated in a relatively wide cavity (32) in the adapter socket (5), with the result that the connection between the female element (1) and the male element (3) can be broken, characterized in that the coupling between the female element (1) and the male element (3) takes place by pushing the connecting means (17) of the female element (1) and the connecting means (55) of the male element (3) on each other by which at least one of said connecting means (17, 55) deviates in radial direction from a neutral elastically non-loaded position and elastically returns in the radial direction into the coupling position.

2. Connector assembly according to claim 1, characterized in that locking of the coupled connecting means (17, 55) of the female element (1) and the male element (3) takes place by further axial displacement of the male element (3) with respect to the adapter socket (5) into a locking position spaced from the coupling position, in which locking position of the connecting means (17, 55) radial displacement of the connecting means (17, 55) is made impossible.

3. Connector assembly according to claim 1, characterized in that the female element (1) is provided with means (13, 19) which limit the movement of the female element (1) inside the adapter socket (5), and that these means (13, 19) as well as the connecting means (17) of the female element are situated on the side of the passage openings (11) which is remote from the end wall (9).

4. Connector assembly according to claim 1, characterized by blocking means (15, 30) on the female element (1) and the adapter socket (5) respectively, said blocking means preventing axial movement of the female element (1) and the adapter socket (5) when the coupling between the female element (1) and the male element (3) is achieved, said blocking means (15, 30) being able to absorb an axial load greater than the axial load needed to couple said connecting means (17, 55) of the female element (1) and the male element (3).

5. Connector assembly according to claim 1, characterized in that the connecting means (17) of the female element (1) is an inward undercutting and the connecting means (55) of the male element (3) is an inwardly projecting stop face.

6. Connector assembly according to claim 1, characterized in that the male element (3) executes a free travel with respect to the female element (1) between the position in which medium is allowed to flow through and the position in which the flow of medium is closed off, without, in the process, releasing the coupling between the female element (1) and the male element (3).

* * * * *